Oct. 14, 1952 H. T. KRAFT 2,614,056
METHOD OF AND APPARATUS FOR FORMING
TIRE BANDS AND BAND SO FORMED
Filed Jan. 16, 1948 3 Sheets-Sheet 2
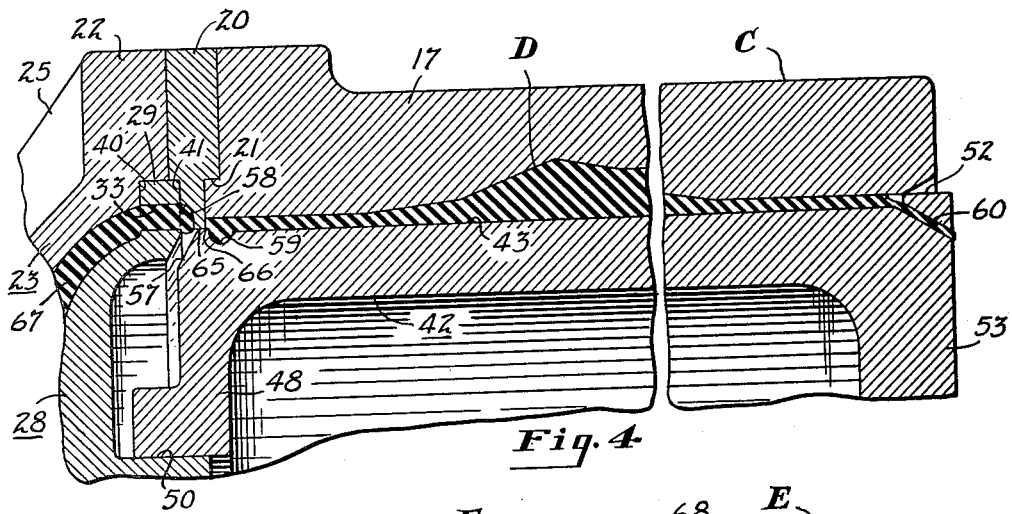
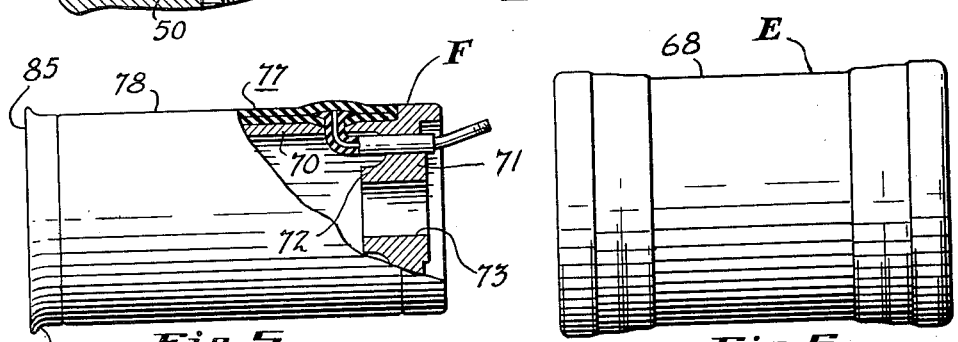 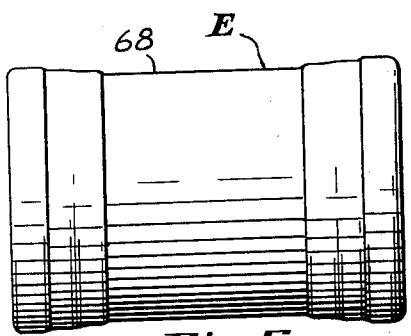
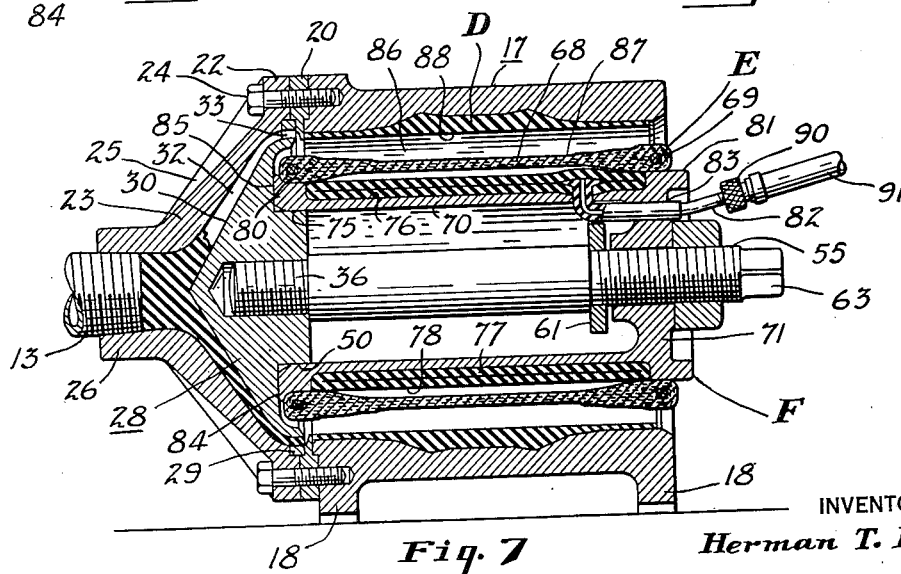
INVENTOR
Herman T. Kraft
BY
Evans + McCoy
ATTORNEYS Oct. 14, 1952

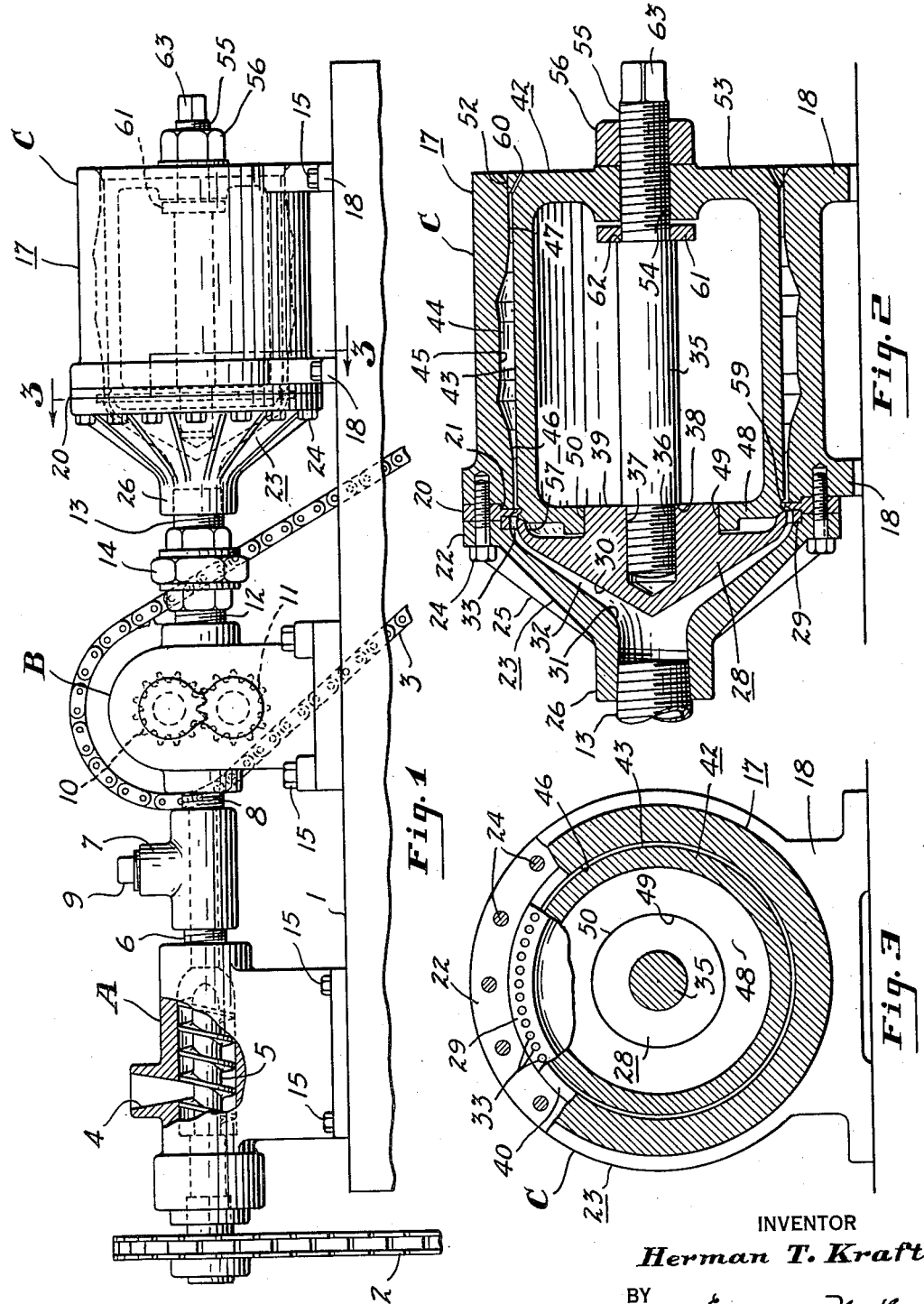

H. T. KRAFT 2,614,056

METHOD OF AND APPARATUS FOR FORMING
TIRE BANDS AND BAND SO FORMED

Filed Jan. 16, 1948

INVENTOR
*Herman T. Kraft*
BY
*Evans & McCoy*
ATTORNEYS

Patented Oct. 14, 1952

2,614,056

UNITED STATES PATENT OFFICE 2,614,056

METHOD OF AND APPARATUS FOR FORMING TIRE BANDS AND BAND SO FORMED

Herman T. Kraft, Akron, Ohio, assignor to The General Tire and Rubber Company, Akron, Ohio, a corporation of Ohio Application January 16, 1948, Serial No. 2,658

23 Claims. (Cl. 154—9)

This invention relates to pneumatic tires, more particularly to an improved annular band of the type used in the so-called flat band tire building process and to a unique method of and apparatus for making the same.

In the manufacture of pneumatic vehicle tires by the flat band process a number of layers of uncured rubber sheets containing bias cut parallel cord ply material are wrapped about a cylindrical drum and assembled with a pair of spaced parallel and axially aligned circular hoops of multiple strand steel wire. The circular margins of the cord ply material are wrapped or folded about the steel hoops to form circular beads at the ends of the cylindrical drum. Breaker and chafer strips are then customarily applied circumferentially about the cord ply material on the drum, although in some constructions these elements may be omitted. A layer of partially cured rubber stock is then wrapped about and adhered to the cord ply material on the drum, this rubber stock being known as the tread stock or band. Thereafter the ply band with the tread band adhering thereto is removed from the drum as by collapsing the latter. The composite unit of ply band and tread band, known as a tire band, is expanded by distending the central portion radially outward to tire shape. The expanded tire band, held in distended shape by an inflated air bag of thick walled rubber is then cured under pressure in a heated mold which vulcanizes the rubber of the tire and forms the desired tread and side wall configurations.

In the assembling of uncured tread rubber stock to the cylindrical ply band, considerable difficulty has been encountered under previous methods in obtaining the desired bond free of pockets and inclusions of air between the tread band rubber and the rubber or cords of the ply band. Tread band stock is supplied to the tire builder in the form of strips or lengths previously extruded or calendered in continuous form to the desired cross sectional shape. The tread band strips are centrally thickened to provide the heavy section of rubber used to form the tread and shoulders of the tire and are marginally relatively thin to form the tire side walls. In applying the tread stock to the ply bands on the building drum, the operator customarily wraps one of the preformed tread strips or "camelbacks" about the drum and joins the meeting ends together. The tacky or sticky nature of the uncured rubber of both the ply band and the tread stock make it difficult to avoid the inclusion of air and many expedients have been devised to press or squeeze out air occlusions. The joining together of the abutted ends of the tread stock is also difficult, yet a strong, dense bond is vital because of the strain imposed thereon during the subsequent expansion of the tire band in preparing the same for the mold and in the curing of the tire under internal pressure in the mold.

The present invention is directed to that phase of the tire making art having to do with the formation of the tread band and the applying of the same to the annular ply band. It is sought to overcome objectionable air occlusions or pockets between the tread and ply bands, to eliminate the use of butt joints in the tread band and to provide a firm, dense and positive bond between the tread and ply bands which is uniform about the entire circumferential extent of the bands.

Another object is to provide, as an intermediate item in the manufacture of pneumatic vehicle tires, an improved tire band and a method of and apparatus for producing the same in which the tread band is seamless and, preferably, is maintained under slight compression circumferentially. More specifically, it is sought to provide a tire band in which the ply material layers or band is under circumferential distension and the inherent resiliency thereof is utilized in maintaining the adherent tread band under circumferential compression.

Another object is to provide an improved method of and apparatus for forming tire tread bands in which each band is freshly formed in such a way as to be immediately available for assembly with or on a cylindrical ply band so that the tread band is fresh and homogeneous. As a specific aspect of this phase of the invention, it is sought to provide a tread band which is molded or extruded from fresh rubber stock into the desired seamless annular form or shape at the time of use and is retained or supported in the mold until and while it is assembled with the ply band.

A still further object of the invention is to provide an approved method of and apparatus for assembling ply bands and tread bands in which a ply band of substantially cylindrical form is expanded radially into contact with a circular or ring-like tread band. As a refinement of this aspect of the invention, a cylindrical ply band is moved axially relative to an externally supported cylindrical tread band to assemble the bands in concentric relation with the ply band disposed within the tread band. Thereafter, the ply band is distended into adhering contact with the tread band to bond the bands together. Subsequent contraction of the ply band shrinks the adhering tread band and withdraws the latter from its external support so that the assembled tire band can be removed from the apparatus as a unit for further processing in accordance with conventional tire making practice.

Other objects and advantages relate to certain details of construction and arrangements of parts in the apparatus, certain procedures, steps and combinations in the process and physical characteristics of the tire band, all of which will become apparent as the following detailed description proceeds. This description is made in connection with the accompanying drawings forming a part of the specification. Like parts throughout the several views are indicated by the same letters and numerals of reference.

In the drawings:

Figure 1 is a fragmentary elevational view, partly in section and with parts broken away and removed, showing assembled elements of a suitable apparatus for practicing the process of the present invention;

Fig. 2 is a sectional view taken longitudinally through the mold used in forming the annular tread band, this view being enlarged with respect to Fig. 1;

Fig. 3 is a sectional view with parts broken away and removed, taken substantially on the line indicated at 3—3 of Fig. 1 and enlarged with respect to that figure;

Fig. 4 is an enlarged and foreshortened sectional detail taken longitudinally through the upper portion of the molding apparatus of Fig. 2 to show the molded tread band and the relation of parts during initiation of the core removing step;

Fig. 5 is an elevational view to the same scale as Figs. 2 and 3, partly in section and with parts broken away and removed, showing the inflatable expanding mandrel or core;

Fig. 6 is an elevational view to the same scale as Figs. 2, 3 and 5, of a cylindrical ply band assembly to which a molded tread band is to be applied in accordance with the principles of and using the apparatus of the present invention;

Fig. 7 is a sectional view taken longitudinally through the apparatus showing the ply band of Fig. 6 assembled on the expanding core of Fig. 5 and supported thereby in concentric relation within the molded tread band internally of the mold, the external mold of this illustration corresponding to that shown in Fig. 2;

Figure 8:
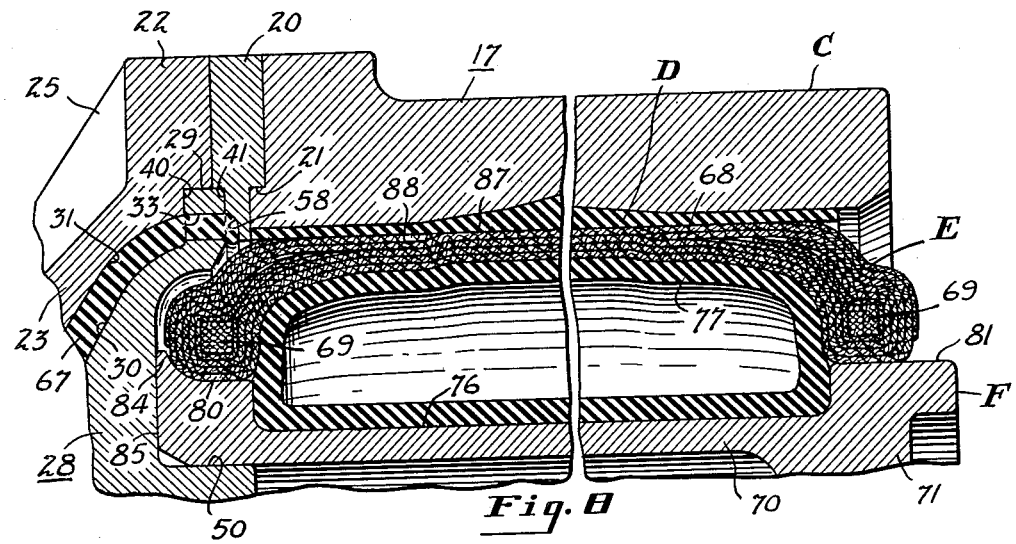
Fig. 8 is an enlarged and foreshortened sectional detail similar to Fig. 4 taken longitudinally through the upper portion of the apparatus showing the ply band expanded into adhering contact with the molded tread band, the external mold of this figure corresponding to that shown in Figs. 2 and 4.

In its broader aspects the present invention contemplates the assembling of tread rubber stock on a substantially cylindrical ply band by forming uncured or partially cured rubber stock substantially to annular tread band shape and moving a preformed ply band relatively into the interior of the formed tread band. Subsequently one of the bands is deformed radially into adhering contact with the other band so that both can be withdrawn from the apparatus or mold in which they are assembled.

A suitable apparatus for making or molding the homogeneous tread bands is illustrated in Fig. 1, this apparatus being designed for making tire bands for relatively small tires such as are used on industrial freight handling cars and trucks and small or light vehicles. The same principles are, however, applicable to the manufacture of tire bands for larger tires such as are used on passenger automobiles, trucks and the like.

Supported on a suitable foundation such as a table or bench 1 are an auger A, gear pump B, and a mold C. The auger and gear pump are driven by chains 2 and 3 respectively from suitable power sources such as electric motors, not shown. Raw rubber stock in strip form fed into auger A through mouth 4 thereof is engaged by worm 5 and discharged under pressure into a conductor 6 which is connected by a T-fitting or coupling 7 to a conductor 8 that leads into the inlet opening or passage of the gear pump B. A closure plug 9 in the T fitting can be removed for opening the T to clean or service the apparatus.

Gears 10 and 11 in the pump B receive the rubber material under pressure from the auger A and force the same under very high or increased pressure into the mold C through conduits 12 and 13 and a union 14 which connects the conduits. The union permits disassembly of the conduits for servicing and for cleaning the apparatus after use. Although the auger, pump and mold are shown assembled in line with their bases secured to the table 1 as by bolts or cap screws 15, they may be located in other arrangements. Furthermore, the present invention is not concerned with the particular apparatus used to force the rubber composition into the mold C, the auger A and the gear pump B merely representing suitable devices for the purpose.

Mold C includes an outer section or member 17 which is in the form of a hollow sleeve or tube of circular cross section. It may be formed of cast metal such as steel or iron and has integral legs 18 which support the mold on the table 1 and receive the cap screws or fasteners 15 which hold the mold in place. Against one end of the outer member 17 is disposed a circular ring or sprue cut-off 20 which acts to shear the connection between the molded tread stock and the rubber in the feed passages as will later appear. The meeting faces of mold section 17 and the shear ring 20 are formed with circumferentially extending mutually offset portions providing circular shoulders that slidingly interfit as indicated at 21 to locate the parts and to hold the shear ring exactly in concentric relation to the mold section.

Against the outer face of the shear ring 20 is disposed a circular flange 22 of hollow conical end cap or feed member 23. Cap screws or bolts 24 extend through aligned openings in the feed member flange 22 and the shear ring 20 and are threaded into holes drilled and tapped in the end face of the mold section 17. These fasteners are arranged in a circle about the end of the mold and are closely spaced to withstand the high internal pressures developed during the molding operation. Also the end member 23 is reinforced as by integral radial ribs 25 which extend from between adjacent cap screws in the flange 22 to circular neck portion 26 at the apex of the cone. This neck is internally threaded to receive the threaded conductor 13 which connects the mold to the discharge side of the gear pump B.

Within the end member 23 is disposed an inner conical member or spreader 28 which serves to direct the incoming plastic rubber stock to flow radially outwardly to the plane of the cylindrical inner walls of the mold outer member or section 17. About the outer edge or periphery of the inner cone 28 is formed an integral circular flange 29 which extends radially outward and is received against the shoulder in a circular recess formed in the end face of the outer cone 23. The flange on the inner cone and the receiving recess therefor on the outer cone are accurately machined to provide a close fit which locates the inner cone in axial alignment with the outer cone. Thus conical face 30 of the inner cone is located in predetermined spaced confronting relation to inner face 31 of the outer cone providing a conical passage 32 extending from the inlet opening in the neck 26 to the outer flange 29 on the inner cone. Preferably the conical faces 30 and 31 are sloped to provide a tapered cross section which is relatively thick adjacent the apex of the cone and becomes progressively thinner toward the outer circumference or margin of the conical members. This tapered conical passage terminates at the circular supporting and positioning flange 29 of the inner cone, the flange being formed with a series of through passages or drilled holes 33 which permit the plastic rubber composition to flow therethrough into the molding cavity. The flange 29 is also piloted within the circular shoulder of a recess 41 in the end face of the shear ring 20 to center the conical feed members with respect to the mold member 17.

Extending longitudinally through the interior of the mold C is a combined support, guide and core extractor in the form of a circular bar 35. This bar is mounted in coaxial relation to the outer mold section 17 as by screwing a reduced diameter threaded end portion 36 of the support into a threaded axial socket 37 formed in the inner cone 28. In assembling the device the bar 35 is screwed tightly into the socket 37 until a radial shoulder 38 is drawn snugly against end face 39 of the inner cone. The cone 28 is, in turn, rigidly supported by the rigid clamping of the circular flange 29 thereof, between shoulder 40 on the outer cone 23 and the recessed inner marginal portion 41 of the shear ring face.

An inner mandrel or core 42 of circular cross section is received within the outer mold section 17 and is formed with a generally cylindrical outer surface 43 which cooperates with the confronting inner face of the mold section 17 to define an annular cavity 44 which, transverse to the longitudinal axis of the mold, is of circular cross section. The inwardly directed face of the mold section 17 includes a central portion 45 which is of greater diameter than end portions 46 and 47 so that the cavity 44 is of greater radial thickness or depth about the central portion of the inner mandrel or core 42 than adjacent the ends of the latter. The cross sectional shape of the cavity 44 corresponds in general to the cross sectional shape of conventional strips of rubber tread stock or "camelback" as currently made by calendering and extruding processes.

Supporting of the core or mandrel 42 in exact concentricity to the outer mold member or section 17 is required in order to maintain a uniform radial thickness or depth in the cavity 44 about its entire circumferential extent. Although the core, which is made as an iron or steel casting, may be supported or guided on the bar 35, other or supplemental guide means are also preferably provided. For example, inner end 48 of the mandrel is formed with a circular opening 49 that is machined to accurate concentricity with respect to the outer surface 43 of the mandrel. An axially extending boss on the inner face of the cone 28 is slidingly received in the end recess of the mandrel and accurately locates the inner end of the core or mandrel in the mold.

At the outer end of the mold core 42 is an increased diameter portion which has a circular outer surface 52 slidingly received in the outer portion of the outermost section to pilot the parts together and to close the end of the mold cavity.

Outer end wall 53 of the mandrel or core has a central aperture or opening 54 which is slidingly received on a reduced diameter threaded end portion 55 of the guide support or rod 35. By means of a nut 56 screwed onto the threaded portion 55 of the rod 35, the nut bearing against the end 53 of the mandrel or core, the mandrel is forced axially into predetermined position in and with respect to the outer mold section, the mandrel or core being located by engagement between the conical or tapered shoulder 57 formed on the inner end of the mandrel adjacent the outer edge thereof and a mating conical seat formed on the inner face of the cone 28.

The inner peripheral edge of the shear ring 20 overlaps the circular flange 29 of the inner cone 28 and in the zone of the passages 33 is relieved or cut away as by machining to provide a circumferentially extending concave cove or guide surface 58 (Fig. 4). Rubber stock forced under pressure through the apertures 33 of the cone flange is thus engaged by the concave guide face of the shear ring 20 about substantially the entire circumference of the latter and deflected to flow radially inward into an annular groove or channel 59 cut into the outer surface 43 of the mandrel or core 42.

The shear ring 20 acts as a barrier or metering device forcing the incoming plastic rubber composition to flow into and through the channel 59 before entering the molding cavity 44. Thus the rubber flows radially inwardly and then outwardly over an ogee path of complete or substantially complete circumferential extent when entering the cavity at the left end of the latter as viewed in Fig. 2. The continued pressure of the incoming rubber composition forces the rubber to move bodily as an advancing wave progressively through the cavity from left to right as viewed in the drawings, the flow taking place substantially simultaneously about the entire circumferential extent of the cavity.

The feed of the plastic rubber composition is continued without interruption until the molding cavity is completely filled as indicated to the operator by the appearance of rubber composition forced through circumferentially spaced breather openings 60 formed in the end 53 of the inner core or mandrel in communication with the extreme right hand end of the molding cavity. A number of the openings 60 are formed at spaced intervals about the entire circumferential extent of the inner core so that the operator can accurately determine the completion of the molding operation by noting the appearance at all of the breather holes of the rubber composition forced therethrough.

After the completion of the molding operation the auger A and gear pump B are stopped to relieve the pressure on the plastic material and the inner mandrel or core 42 is withdrawn from the mold. One mechanical arrangement for forcing the core out of the mold is illustrated and comprises the guide bar 35 fitted with a pressure collar 61 which is received on the reduced diameter end 55 so as to bear against circumferential shoulder 62 of the bar. Turning the bar 35 in a reverse direction as by means of a wrench applied to outer squared end 63 unscrews the bar from the threaded recess 37 in the cone 28 forcing the bar to the right. This movement of the bar brings the pressure collar 61 axially against the inner face of the end 53 of the mandrel, shifting the mandrel to the right with strong force.

As the withdrawal of the mandrel from the mold is initiated, inner edge 65 of the shear ring 20 is moved relatively across the channel 59 in the face of the mandrel, shearing the rubber against a cooperating edge corner formed by circumferential land 66 at the end of the mandrel. The shear ring inner face 65 is formed to approximately the same diameter as the confronting land 66 of the core to provide the desired shearing action which severs rubber stock 67 in the mold feed passage 32 from rubber stock in the mold cavity 44 which now forms the annular tread band D.

As the mandrel 42 is withdrawn from the mold its outer face 43 slides axially along the inner face 88 of the annular rubber tread band D. To facilitate this withdrawal of the mandrel or core, adhesion between the rubber stock and the mandrel face 43 is minimized as by coating the outer face 43 with a smooth material such as plated on chromium or by applying an anti-adhesion agent such as soapstone or by both plating and soaping the surface.

As a further refinement the invention contemplates the provision of a taper or "draw" to the mold cavity 44 such as by making the mandrel surface 43 tapered, the larger diameter end being to the right as viewed in the drawings. Various amounts of taper are satisfactory, preferably a taper of less than 5° being used, preferably about 1°. A large taper is undesirable since the resulting tread band tends to be distorted from the desired cylindrical shape. In forming the mold cavity with a draw or taper the right hand end portion 47 of the inner mold face is made slightly larger in diameter than the left hand portion 46 of such mold face so as to maintain proper radial depth or thickness in the mold cavity 44. However, the radial depth or thickness of the mold cavity at the two ends of the mold are not the same, the right hand end of the cavity being slightly thinner than the left hand end to compensate for the larger diameter. Thus the quantity of rubber molded into both marginal portions of the annular tread band D is made substantially equal so that when the tread band is assembled with the ply band and contracted to the desired size and cylindrical shape, the two opposite marginal portions of the tread band are of uniform thickness. While the inner surface of the tread band D, shaped by the core 42 is substantially cylindrical, the outer face of the tread band is characterized or of irregular shape across its width having been shaped by the inner face of the mold section 17 having small diameter end portions 46 and 47 and a relatively larger diameter central portion 45.

In Fig. 6 is illustrated a ply band E of the type to be assembled with the tread band. The ply bands may be made by conventional methods on collapsible cylindrical drums or they may be made on apparatuses of the character shown in United States Patent 2,313,035, issued March 9, 1943, to Walter J. Breth and titled, "Method of and Apparatus for Building Tires." The ply bands are of tubular cylindrical form being composed of a plurality of built up layers of bias cut parallel cords embedded in rubber. Fig. 8 shows the cross sectional construction, the other figures representing the ply band diagrammatically. The band may include four, six, or more plys in accordance with usual tire building practice, these ply material layers being indicated at 68 in the drawings. The marginal edges of the ply layers are folded about inextensible beads 69 formed of a number of turns of steel wire suitably bound together.

In making the ply bands in accordance with conventional methods or the apparatuses and processes of the patent referred to, the bands are removed from the building drums without having rubber tread stock material applied thereto. It is contemplated that the ply bands E will be mass produced and supplied to the operator or operators of the molding apparatus of the present invention. After the molding of a tread band D in accordance with the injection method described above and after the withdrawal from the interior of the molding apparatus of the mandrel or core 42 in the manner described, leaving the tread band D supported externally by the embracing outer mold section 17 as shown in Fig. 7, the operator assembles one of the ply bands E on a cylindrical expander or support member F such as illustrated in Fig. 5. The ply band E is assembled on the expander by sliding the band axially thereover. The expander, carrying the ply band, is then inserted into the interior of the mold section 17 to the position illustrated in Fig. 7, the expander being received on and guided by the support bar 35.

The expander F is a cast iron or steel tube 70 having an integral end closure wall 71. This end wall has an axially elongated hub 72 formed with an axial opening 73 which has a running fit on the reduced diameter end portion 55 of the support rod 35 so as to guide the expander as the latter is moved axially into the interior of the mold. The end of the expander opposite the end wall 71 is formed with a circular internal bore 75 which is of the same size as the corresponding bore or opening 49 of the mandrel 42 so as to be received slidingly on the cylindrical guide boss 50 of the inner cone 28. For convenience in production the internal bore 75 of the expander may be continued throughout the entire length of the tube or cylinder 70 as shown in Fig. 7.

The major portion of the axial extent of the expander tube 70 is circumferentially relieved or cut away providing a reduced diameter annular channel 76 which receives a sleeve-like hollow inflatable annulus 77 of substantially flat cross section. The radial thickness of the annulus corresponds approximately to the radial depth of the expander channel 76 so that outer surface 78 of the annulus is substantially flush with cylindrical end portions 80 and 81 of the expander. A tubular inflating stem 82 connected to the interior of the annulus 77 extends inwardly to the interior of the expander tube 70 through a radial opening in the latter and then axially through opening 83 in the expander end wall 71.

On the inner end of the expander F a radially outwardly directed circumferential flange 84 serves as a limiting stop engageable with the end of the ply band E to locate the latter on the expander. Desirably the flange 84 has a curved inner face which blends into the cylindrical surface 80 of the expander end.

The clamping nut 56, removed from the threaded end of the support rod 35 during withdrawal of the mandrel 42 and the insertion of the expander and ply band assembly is replaced and tightened against the expander end wall 71 so as to press inner end face 85 of the expander member 70 against the inside face of the cone 28, thus locating the expander in predetermined position within the mold.

As shown in Fig. 7 the molded rubber tread band D is formed to an internal diameter which throughout its entire axial extent is greater than the maximum diameter of the ply band E, thus providing a continuous annular clearance 86 between the parts which permits the insertion of the ply band without contact between the tacky surfaces of the two bands. In this connection it is to be observed that the expander F serves as a positioning means for accurately locating the ply band within the mold casing which supports the formed tread band. Being guided by the support rod 35, the expander F guides the ply band E along a concentric path with respect to the tread band D as the relative axial movement takes place. This feature is of great utility for the reason that external surface 87 of the ply band E and internal surface 88 of the tread band D are raw or partially cured rubber, extremely tacky and adherent should they be brought into contact.

With the ply band E supported on the expander F in concentric relation to and internally of the externally supported tread band D, all in predetermined relative positions as shown in Fig. 7, fluid under pressure is introduced into the expansible annulus 77 as by means of an air chuck 90 connected to a suitable source of air pressure by a flexible air hose 91. The inflatable rubber annulus 77 is distended by the air or fluid pressure supplied internally thereof to expand the enveloping or surrounding ply band E outwardly against the tread band D, the parts taking substantially the shapes or positions illustrated in Fig. 8. During the expansion of the ply band the inextensible bead wires 69, disposed axially beyond the ends of the inflatable rubber annulus 77, closely surround the cylindrical portions 80 and 81 of the expander F and prevent the inflatable annulus from blowing out axially through the ends of the device between the ply band E and the expander body 70.

In the expanding operation the annulus 77 of the expander tends to assume the circular section customary in inflated bodies thereby effecting an initial contact between the circumferentially extending central portions of the tread band D and the ply band E. As the inflation pressure within the annulus 77 is increased, the outer surface 87 of the ply band is progressively flattened out against the confronting internal surface 88 of the ply band D, the area of contact moving axially in both directions until the entire internal area of the tread band surface 88 is firmly bonded to the outer surface of the ply band E.

Figure 9:
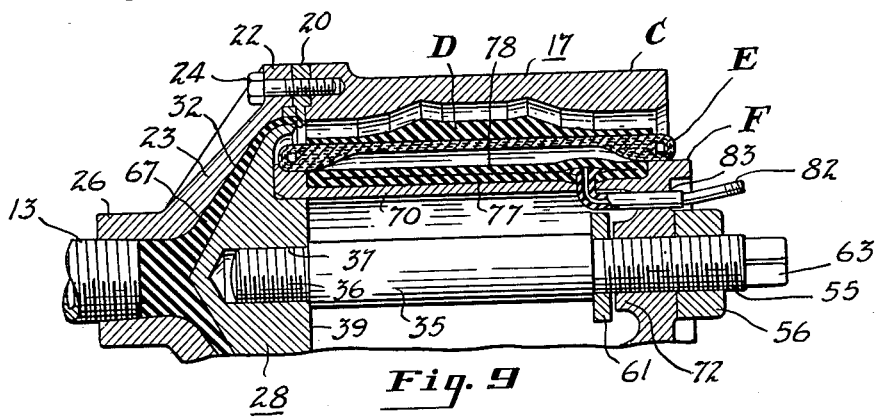
Fig. 9 is a fragmentary longitudinal sectional view of the apparatus shown in Fig. 7 showing the tread band adhering to the ply band and withdrawn by the contraction of the latter from contact with the internal walls of the mold.

The pressure employed to effect the expansion of the ply band varies with the particular apparatus and the depth or radial extent of the clearance 86 which is initially provided between the parts. For usual applications of the invention in making the small tires referred to for industrial cars and freight trucks, pressures from about 80 pounds to about 150 pounds per square inch have been found adequate although, of course, greater pressures may be used to achieve a more pronounced compacting and stitching action for adhering the tread band to the ply band. The internal pressure is maintained in the inflatable annulus 77 for a time interval which allows the rubber to adjust and bond together. Thereafter the pressure is released and the inherent resiliency of the ply band E causes the latter to contract radially inward. The adhesive bond between the ply band E and the tread band D is greater than the bond between the latter and the internal metal faces 45, 46 and 47 of the mold section 17. Accordingly, the contraction of the ply band E disengages the tread band D from the supporting mold section 17 and contracts the tread band to a position such as that illustrated in Fig. 9. So contracted, the tread band D is circumferentially compressed, the inherent resiliency of the ply band resisting the compression and maintaining a slight expansion or distention of the ply band E.

The assembling of the bands being thus completed, the expander F is withdrawn from the interior of the mold section 17 by removing the nut 56 from the support rod 35 and unscrewing the latter by means of a wrench applied to the square end 63 thereof in the manner previously described in connection with the removal or freeing of the molding mandrel or core 42. The pressure washer 61 bears against the internal face of the expander hub 72 to force the expander axially to the right as viewed in Fig. 9 so that it then can be manually withdrawn from the molding apparatus and the assembled ply and tread bands removed.

Figure 10:
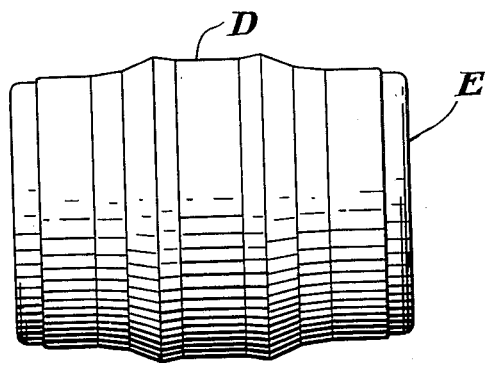
Fig. 10 is an elevational view of the completed tire band after removal thereof from the molding apparatus and the expanding mandrel or core.

The assembled bands illustrated in Fig. 10 represent an intermediate item in the manufacture of pneumatic tires and further processing for molding or vulcanizing thereof is performed in accordance with conventional procedures. These assembled bands, which constitute what is known in the trade as a flat tire band, are expanded and assembled with annular air bags after which the expanded tire bands, still containing the air bags, are inserted in heated molds for curing and shaping to final form.

The present invention thus provides an improved method of and apparatus for performing a vital step in the production of tires. The invention is adaptable for use in connection with conventional band building machines and tire molds. The unsatisfactory practice of attempting to assemble bulky and unwieldy tread bands on the ply bands by wrapping strips of tread stock or camelback about the ply bands and bonding the camelback ends has been eliminated. By the use of the present invention, ply bands which can be efficiently and rapidly mass produced are supplied to the tread band forming apparatus of the present invention and in rapid succession the fresh, preformed, injection molded tread bands are quickly and accurately assembled thereon. As soon as the expander F is withdrawn from the interior of the mold section 17 carrying the assembled ply and tread bands therewith the molding core or mandrel 42 is reinserted, another tread band is molded by the injection method described and the process or cycle is repeated.

The principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What I claim is:

1. The method of assembling tread rubber stock on a substantially cylindrical tire ply band which comprises forming rubber stock substantially to annular tread band shape, moving the tire ply band relatively into the tread band, and expanding the ply band radially into adhering contact with the tread band.

2. The method of assembling tread rubber stock on a substantially cylindrical tire ply band which comprises forming rubber stock substantially to annular tread band shape, moving the bands axially together to position the tread band in surrounding relation to the ply band and radially spaced therefrom, and expanding the ply band radially into adhering contact with the tread band.

3. The method of assembling tread rubber stock on a substantially cylindrical tire ply band which comprises forming rubber stock substantially to annular tread band shape, moving the tire ply band relatively into the tread band, expanding the ply band radially into adhering contact with the tread band, and simultaneously contracting both bands radially around their entire circumferential extent.

4. The method of assembling tread rubber stock on a substantially cylindrical tire ply band which comprises forming rubber stock substantially to annular tread band shape having a substantially cylindrical inner surface and a charactered outer surface, moving the tire ply band relatively into the tread band while supporting the latter through contact with the outer surface only thereof, expanding the ply band radially against the inner surface of the tread band, and adhering the bands together.

5. The method of assembling tread rubber stock on a tire ply band which comprises forming rubber stock substantially to annular shape to provide a tread band with a substantially cylindrical inner surface and a charactered outer surface, the tread band having relatively thin circular marginal portions and a relatively thick circular central portion, supporting the tread band through engagement with the outer surface thereof, moving a tire ply band and the tread band relatively together to position the tread band about the ply band, and expanding the ply band radially against the inner surface of the tread band to effect an adhesive bond therebetween.

6. The method of building a tire band which comprises separately forming an annular ply band and an annular tread band, telescoping the bands to position the tread band in surrounding relation to the ply band, and moving one of the bands radially into adhesive contact with the other substantially simultaneously around the entire circumferential extent of the bands.

7. The method of building a tire band which comprises separately forming an annular ply band and an annular tread band, telescoping the bands to position the tread band in surrounding relation to the ply band, and adhering the bands together.

8. The method of building a tire band which comprises separately forming an annular ply band and an annular tread band, telescoping the bands to position the tread band in surrounding relation to the ply band, adhering the bands together and circumferentially contracting one of the bands around substantially its entire circumferential extent.

9. The method of assembling tread rubber stock on a substantially cylindrical tire ply band which comprises forming rubber stock substantially to annular tread band shape, supporting the formed stock by contacting only the outer surface thereof, moving the tire ply band relatively axially to insert the same into the supported tread band stock, and expanding the inserted ply band against the tread band.

10. As an intermediate article of manufacture in the making of rubber vehicle tires, a tire band comprising an annular ply band of rubber coated cords and a seamless annular tread band of substantially uncured rubber assembled together with the tread band embracing the ply band and with the tread band compressed circumferentially, the ply band being substantially free of circumferential compression.

11. As an intermediate article of manufacture in the making of rubber vehicle tires, a substantially cylindrical composite tire band of annular form comprising an inner annular ply band of rubber coated cords under slight circumferential tension and an outer seamless annular tread band of uncured rubber under slight circumferential compression circumferentially embracing the ply band and adhesively bonded thereto, the tension and compression of the bands being mutually maintained through the bond therebetween.

12. Apparatus for forming tire tread bands and applying them to annular ply bands comprising a mold for shaping plastic rubber composition into a seamless annular tread band of substantially cylindrical form, said mold including a member for supporting the shaped band solely by contact with the outer surface thereof, means for supporting an annular ply band and moving the same axially to a position within the supported tread band, and means associated with the ply band supporting means for expanding the positioned ply band radially into adhering contact with the inner surface of the tread band.

13. Apparatus for forming tire tread bands and applying them to annular ply bands comprising a mold for shaping plastic rubber composition into a seamless annular tread band of substantially cylindrical form, said mold including a member for supporting the shaped band solely by contact with the outer surface thereof, means for supporting an annular ply band and moving the same axially to a position within the supported tread band, the supporting means including an inflatable member, and means for introducing fluid under pressure into the inflatable member for expanding the positioned ply band radially into adhering contact with the inner surface of the tread band.

14. Apparatus for forming tire tread bands and applying them to annular ply bands comprising means for shaping plastic rubber composition into a seamless annular tread band of substantially cylindrical form, said means including a member for supporting the shaped band solely by contact with the outer surface thereof, means for supporting an annular ply band and moving the same axially to a position within the supported tread band, the supporting means including an inflatable annulus making contact with the supported ply band circumferentially around substantially the entire inside surface of such ply band, and means for introducing fluid under pressure into the inflatable annulus for expanding the same against the positioned ply band to force the latter into adhering contact with the inner surface of the tread band.

15. The method of assembling tread rubber stock on a substantially cylindrical tire ply band which comprises forming rubber stock substantially to annular tread band shape, moving the tread band and the ply band axially relative to one another to position the ply band telescopically within the tread band, and expanding the ply band radially into adhering contact with the tread band.

16. The method of assembling tread rubber stock on a tire ply band which comprises forming rubber stock substantially to annular shape to provide a tread band with a substantially cylindrical inner surface and a charactered outer surface, the tread band having relatively thin circular marginal portions and a relatively thick circular central portion, supporting the tread band through engagement with the outer surface thereof, moving a tire ply band and the tread band relatively together to position the tread band about the ply band, expanding the ply band radially against the inner surface of the tread band to effect an adhesive bond therebetween, contracting the ply band and the tread band adhering thereto as a unit to reduce the overall diameter thereof, and moving the contracted unit axially away from the locale of the bonding.

17. In the method of assembling tread rubber stock on a tire ply band by forming rubber stock substantially to annular shape in a rigid mold having a charactered inner face to provide a tread band with an inner face and a charactered outer face, the improvement which comprises supporting the tread band by engagement of the outer face thereof with the inner mold face, moving a tire ply band and the tread band relatively together telescopically to position the supported tread band about the ply band, and contracting the tread band to withdraw the latter from the charactered mold face for movement of the assembled band axially relative to the mold in withdrawal.

18. In the method of assembling tread rubber stock on a tire ply band by forming rubber stock substantially to annular shape in a rigid mold having a charactered inner face to provide a tread band with an inner face and a charactered outer face, the improvement which comprises supporting the tread band by engagement of the outer face thereof with the inner mold face, moving a tire ply band and the tread band relatively together telescopically to position the supported tread band about the ply band, contracting the tread band circumferentially to reduce the diameter thereof sufficiently to clear the charactered mold face, and moving the tread band and the ply band as a unit axially relative to the mold to withdraw the unit from the mold.

19. Apparatus for shaping tire tread bands comprising a mold having an interior cavity of substantially circular cross section and of generally cylindrical shape, a generally cylindrical core and means supporting the same coaxially in the mold to define an annular molding cavity having spaced end portions of relatively thin section and a central portion of relatively thick section, means providing a sprue passage for feeding plastic tread stock material to one end of the mold and to one end portion of the cavity, gate means between the sprue passage and the cavity communicating with substantially the entire circumferential extent of the latter at said one end whereby plastic material fed into the cavity through the gate means flows axially in the cavity from said one end portion to the other end portion substantially simultaneously about substantially the entire circumferential extent of the cavity in the formation of a seamless annular tread band, and means for forcing the core axially from the other end of the mold and a formed tread band to withdraw the core in the same direction as the direction of said plastic material flow.

20. Apparatus for forming tire tread bands comprising a mold having an internal circular sectioned face contoured to form the desired profile on a tread band shaped therein, a metal core having a generally cylindrical outer face, means supporting the core within the mold with the mold face and the core face substantially concentric to one another to define therebetween an annular mold cavity, the core being movable axially relative to the mold in one direction for withdrawal movement and in a reverse direction for insertion movement, passage means for guiding plastic rubber composition into the mold cavity about substantially the entire circumferential extent of the cavity, means for shifting the core axially relative to the mold to withdraw the core from the mold, and means including coacting components movable respectively with the mold and the core for severing rubber material extending between the passage means and the cavity as withdrawal movement of the core is initiated.

21. Apparatus for forming annular bands of rubber comprising an annular metal mold member having an inner annular face contoured to provide the desired profile on rubber molded therein, a ring carried by one end of the mold member, a hollow feed member disposed over said end of the mold member, an internal member extending into the feed member and defining therewith a sprue passage communicating with the interior of the mold member at a number of points spaced circumferentially about said ring, a rigid core member mounted for axial movement into and out of the mold member and cooperable with the latter to define a molding cavity, one end of the core member being receivable within the ring, and means on said one end of the core member providing a circumferential shoulder spaced from the ring in the provision of a circumferential gate through which plastic rubber is fed into the molding cavity from said sprue passage.

22. Apparatus for forming annular bands of rubber comprising an annular metal mold member having an inner annular face contoured to provide the desired profile on rubber molded therein, a ring carried by one end of the mold member, a hollow feed member disposed over said end of the mold member, an internal member extending into the feed member and defining therewith a sprue passage communicating with the interior of the mold member at a number of points spaced circumferentially about said ring, a rigid core member mounted for axial movement into and out of the mold member and cooperable with the latter to define a molding cavity, one end of the core member being receivable within the ring, and means on said one end of the core member providing a circumferential shoulder spaced from the ring in the provision of a circumferential gate through which plastic rubber is fed into the molding cavity from said sprue passage, said shoulder and the ring coacting to shear rubber material extending through the gate upon withdrawal of the core member from the mold member.

23. Apparatus for shaping tire tread bands comprising a mold having a hollow interior of substantially circular cross section and of generally cylindrical shape, a support extending through the mold interior, a generally cylindrical core slidable on the support in one direction for axial insertion into and in a reverse direction for axial withdrawal from the mold, the mold and core being formed to define an annular molding cavity having spaced end portions of relatively thin section and a central portion of relatively thick section, means providing a sprue passage for feeding plastic tread stock material to one end of the mold and to one end portion of the cavity, gate means between the sprue passage and the cavity communicating with substantially the entire circumferential extent of the latter at said one end whereby plastic material fed into the cavity through the gate means flows axially in the cavity from said one end portion to the other end portion substantially simultaneously about substantially the entire circumferential extent of the cavity in the formation of a seamless annular tread band, and means for sliding the core axially on the support for withdrawal of the core from the other end of the mold and from a formed tread band in the same direction as the direction of said plastic material flow.

HERMAN T. KRAFT.

REFERENCES CITED

The following references are of record in the file of this patent:

UNITED STATES PATENTS

| Number | Name | Date |
| --- | --- | --- |
| 1,245,898 | Gates | Nov. 6, 1917 |
| 1,645,726 | Vaughan | Oct. 18, 1927 |
| 1,747,533 | Sessions | Feb. 18, 1930 |
| 1,987,350 | Reel | Jan. 8, 1935 |
| 2,047,379 | Matson | July 14, 1936 |
| 2,297,354 | Hawkinson | Sept. 29, 1942 |
| 2,301,338 | Smith | Nov. 10, 1942 |
| 2,306,205 | Crosman | Dec. 22, 1942 |
| 2,360,023 | Tucker | Oct. 10, 1944 |
| 2,368,808 | Sayre | Nov. 28, 1944 |
| 2,370,972 | Kraft | Mar. 6, 1945 |
| 2,424,235 | Hoffer | July 22, 1947 |
| 2,430,560 | Elliot | Nov. 11, 1947 |
| 2,476,884 | Maynard | July 19, 1949 |
| 2,495,064 | Howath | Jan. 17, 1950 |